United States Patent [19]

Comstock et al.

[11] Patent Number: 5,374,357
[45] Date of Patent: Dec. 20, 1994

[54] FILTER MEDIA TREATMENT OF A FLUID FLOW TO REMOVE COLLOIDAL MATTER

[75] Inventors: Daniel L. Comstock, Escondido; Lee A. Durham, Oceanside; Mark A. Warren, Murrietta; Bryce P. Anderson, Carlsbad, all of Calif.

[73] Assignee: D. W. Walker & Associates, San Marcos, Calif.

[21] Appl. No.: 33,860

[22] Filed: Mar. 19, 1993

[51] Int. Cl.$^5$ .................. C02F 1/28; C02F 1/54
[52] U.S. Cl. .................. 210/666; 210/669; 210/679; 210/723; 210/504; 210/506; 502/402; 502/407
[58] Field of Search ............... 210/666, 669, 777, 778, 210/506, 679, 723, 504; 502/402, 407; 252/449; 427/214, 215, 220, 221

[56] References Cited

U.S. PATENT DOCUMENTS

| | | | |
|---|---|---|---|
| 2,036,258 | 4/1936 | Cummins | 210/679 |
| 2,106,318 | 1/1938 | Elliott et al. | 210/679 |
| 2,764,512 | 9/1956 | Wilson | 210/679 |
| 3,007,878 | 11/1961 | Alexander et al. | 252/313 |
| 3,252,899 | 5/1966 | Rice et al. | 210/666 |
| 3,377,274 | 4/1968 | Burke et al. | 210/723 |
| 3,953,360 | 4/1976 | Morishita et al. | 210/679 |
| 3,997,483 | 12/1976 | Wurster et al. | 210/679 |
| 4,007,113 | 2/1977 | Ostreicher | 210/504 |
| 4,007,114 | 2/1977 | Ostreicher | 210/504 |
| 4,079,001 | 3/1978 | Haase et al. | 210/679 |
| 4,167,481 | 9/1979 | Cremers et al. | 210/679 |
| 4,238,334 | 12/1980 | Halbfoster | 210/679 |
| 4,263,146 | 4/1981 | Wegmüller et al. | 210/679 |
| 4,274,968 | 6/1981 | Grutsch et al. | 210/666 |
| 4,288,462 | 9/1981 | Hou et al. | 210/777 |
| 4,363,749 | 12/1982 | Weiss et al. | 252/449 |
| 4,537,683 | 8/1985 | Isacoff et al. | 210/778 |
| 4,617,128 | 10/1986 | Ostreicher | 210/679 |
| 4,645,567 | 2/1987 | Hou et al. | 210/777 |
| 4,668,403 | 5/1987 | Walterick, Jr. et al. | 210/666 |
| 4,668,404 | 5/1987 | Walterick, Jr. | 210/666 |
| 4,737,293 | 4/1988 | Walterick, Jr. et al. | 210/666 |
| 5,051,189 | 9/1991 | Farrah | 210/679 |
| 5,137,639 | 8/1992 | Guzik et al. | 210/679 |

OTHER PUBLICATIONS

*Nalco Water Handbook* pp. 8-1 to 8-3 and G-2 to G-4, Kemmer, McGraw-Hill Book Co, (1984).

Riddick, *Zeta Potential: New Tool for Water Treatment*, Part I, *Chemical Engineering* pp. 121-126, Jun., 1961, and Part II, *Chemical Engineering*, pp. 141-146, Jul., 1961.

*Primary Examiner*—Cynthia L. Nessler
*Attorney, Agent, or Firm*—Gregory Garmong

[57] ABSTRACT

Colloidal matter is removed from a fluid flow by first adsorbing a coagulant onto the surface of a finely divided filter media, and thereafter passing a colloid-containing fluid through the filter media. The adsorbing of coagulant is accomplished with the filter off-line, and it is returned on-line for filtering of the fluid. After the coagulant is adsorbed onto the filter media, it is not necessary to continue feeding coagulant during on-line operation, as the adsorbed coagulant captures the colloidal matter in the fluid and retains it on the surface of the filter media. The captured colloidal matter is removed during back washing of the filter media.

18 Claims, 4 Drawing Sheets

FILTER MEDIA TREATMENT OF A FLUID FLOW TO REMOVE COLLOIDAL MATTER

BACKGROUND OF THE INVENTION

This invention relates to the treatment of fluid flows to remove colloidal matter, and, more particularly, to a media filter that removes colloidal matter.

Fluid flows often contain solid and soluble contaminants that must be removed before discharge or reuse of the fluid. For example, an industrial operation may use water to wash product. The wash water can contain large solid particles, very small solid particles termed colloidal particles, and soluble species. Before the wash water can either be discharged to the sewer system or reused in the wash operation, both the particles and soluble species must be removed to acceptably low levels as required by environmental regulations or process flow requirements.

In one common cleaning approach, during on-line operation the contaminated fluid is passed through a media filter containing a packed, finely divided filter media material such as crushed coal, sand, and gravel. The large particles in the fluid flow are captured within the filter media, for later removal by off-line backflushing. The colloidal particles are not readily captured by the filter media, because they are so small that they pass through the passageways within the filter media. To permit capture of the colloidal particles, it is a common, but not universal, practice to add a small amount (typically about 2-20 parts per million) of a coagulant to the fluid flow, upstream of the media filter. The coagulant causes the colloidal particles to coalesce together into larger particles, which can be captured within the media filter.

After the solid matter is removed in the filter, the soluble species are removed from the fluid. In one approach, the fluid is passed across a reverse-osmosis (RO) membrane, in which salts and other soluble components are removed. The result is a clarified fluid flow having a large fraction of both solid and soluble impurities reduced to acceptably low levels. It is a conventional practice to add an anti-scalant compound to the fluid flow after it leaves the media filter and before it enters the reverse-osmosis unit. The anti-scalant compound inhibits the deposition and buildup of scale within the reverse-osmosis unit. The presence of such scale inhibits the operation of the reverse-osmosis unit.

Such systems work well in an idealized operation, where precisely the right amount of coagulant is added upstream of the media filter. However, in actual practice problems can arise if exactly the right amount of coagulant is not added. If too little coagulant is added, some of the colloidal matter is not captured and reaches the reverse-osmosis unit or the outflow. If too much coagulant is added, the coagulant reacts with the anti-scalant compound to form a thick, sludge-like residue that can foul the pipes and the reverse-osmosis membrane. Cleanup after fouling is a major operation requiring extensive downtime of the plant.

It is difficult to know precisely the amount of coagulant to add, because the water quality and fluid flow rate can vary over time. As a result of the risk of fouling due to the reaction of excess coagulant and anti-scalant compound, most fluid-treatment plants of this type operate with no coagulant addition at all, or a deficiency of coagulant addition as compared with the optimal value for removing all of the colloidal material. Reverse-osmosis membranes therefore are prone to more rapid fouling due to deposition of colloidal matter on the membranes, and the final process water quality is not as good as it might otherwise be if the colloidal matter were more completely removed.

There is a need for a better approach to the treatment of fluid flows such as process and municipal water flows, to remove both the large and colloidal particulate matter, as well as the soluble impurities. The present invention fulfills this need, and further provides related advantages.

SUMMARY OF THE INVENTION

The present invention relates to an approach for improving the operation of media filters using an improved filter media material. The approach of the invention achieves optimal, self-regulated removal of colloidal matter from the fluid, as well as the removal of larger particles through the use of a filter media. The consumption of expensive coagulant chemicals is reduced. Adverse reactions with anti-scalants due to overdoses of coagulant are avoided. The system of the invention can therefore be readily operated by unskilled operators. The fluid which has been processed to remove solids can be treated by reverse osmosis or other technique to remove soluble impurities. The quality of the fluid after treatment to remove solid and soluble impurities is largely independent of the content and types of such impurities in the process feed stream.

In accordance with the invention, a method of purifying a fluid flow comprises the steps of providing a coagulant compound in a form that can adsorb onto the surface of a filter media and providing in a media filter a finely divided solid filter media that can adsorb the coagulant compound at its surface. The filter media is treated with the coagulant compound form such that a quantity of the coagulant compound is adsorbed onto the surface of the filter media, in off-line treatment of the media filter. The method further includes providing a flow of a fluid containing colloidal matter, and passing the fluid through the filter media, in on-line operation of the media filter.

In this approach, the coagulant is adsorbed onto the finely divided filter media material. In the preferred approach, there is no further or continuous addition of coagulant to the fluid flow when the media filter is on-line to filter the fluid containing the colloidal matter. Thus, there can be no addition of the coagulant in too-large or too-small a quantity, and the method is self regulating in this respect.

The coagulant is adsorbed onto the filter media when the filter is off-line and the fluid containing the colloidal matter is not passing through the filter. Thus, to adsorb coagulant the fluid flow is diverted or stopped, and the coagulant is contacted to the filter media. Desirably, a flow of concentrated liquid coagulant is passed through the filter media or filled into the media filter which contains the filter media, and contact is continued for a sufficient time to permit adsorption. This adsorbing operation is preferably accomplished during the period when the media filter is off-line for backflushing to remove accumulated solids. That is, the media filter is taken off-line and backflushed to remove accumulated solids. The coagulant is contacted with the filter media to permit adsorption, either with or without the contaminated fluid passing therethrough. Thereafter the filter is returned to service.

The filter media selected must be suited for the adsorption of the coagulant. Many materials are operable, including, for example, silica-based materials such as gravel, rocks, sand, and glass, carbon-based materials such as crushed coal, and carbon-chain materials such as organic polymers. Ion exchange resins have been found suitable. Of these resins, cation exchange resins in their depleted (i.e., sodium replaced with calcium and/or magnesium) form are most preferred. Where the adsorption of a coagulant by a particular filter media material is insufficient, the surface may be treated as necessary to increase its adsorption.

The invention also extends to the preparation of a dry filter media material that is suitable for loading into media filters for specialized applications. Thus, a dry filter media material comprises a finely divided filter media, and a coagulant compound adsorbed at the surface of the filter media. The coagulant compound is a chemical that is operable to coagulate solid matter in a fluid flow. A filter media material is prepared by providing a coagulant compound, providing a finely divided solid filter media that can adsorb the coagulant compound at its surface, treating the filter media with the coagulant compound form such that a quantity of the coagulant compound is adsorbed onto the surface of the filter media, and thereafter discontinuing the step of treating, and drying the filter media material. This unique material can then be bagged or otherwise shipped to a media filter unit and loaded therein.

The present invention provides an important advance in the art of the removal of contaminants from fluids. Colloidal solids as well as larger particles are removed from a fluid flow using a media filter, but without adding a continuous flow of a coagulant. The filtrate of the media filter is suitable for removal of dissolved solids using techniques such as reverse osmosis, with substantially reduced likelihood of fouling of the reverse-osmosis unit.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
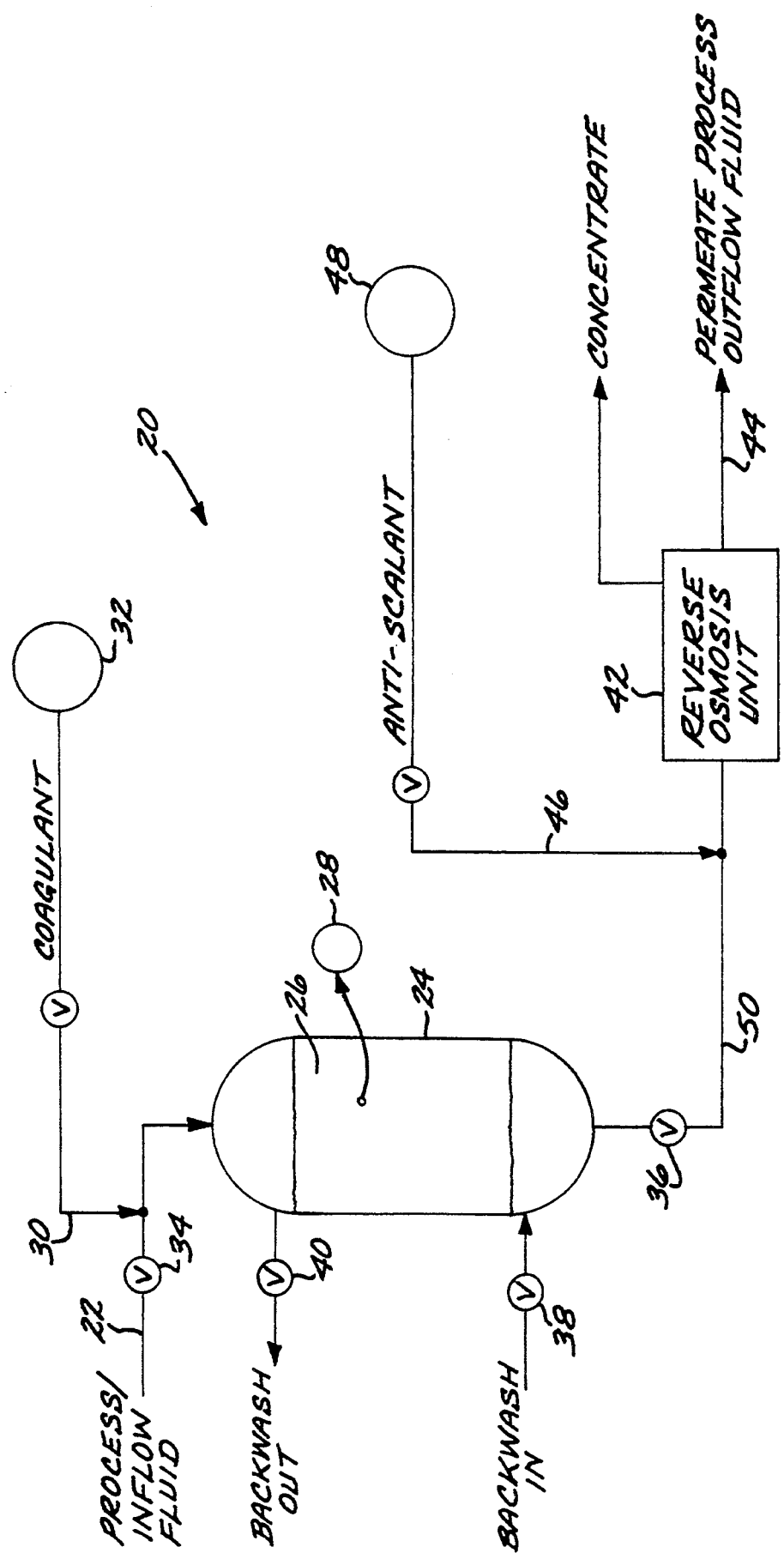
FIG. 1 is a schematic drawing of a conventional filtration system, with an enlarged inset showing a conventional filter media particle.

FIG. 1 depicts a conventional approach to removing particulate and dissolved matter from a fluid flow. In the depleted system 20, a process inflow fluid flow 22 is introduced into a media filter 24. The media filter 24 contains a filter media 26. (As used herein, the "filter media" is a finely divided solid material which accomplishes filtration. In its normal use, it is contained within the "media filter" container.) The filter media 26 may be a single material such as a mass of particles 28 (shown in an enlarged view in FIG. 1), or it may be a layered arrangement of several types of finely divided material. An example is a layer of crushed coal first encountered by the fluid flow, followed by a layer of sand and a layer of gravel.

The filter media operates by the principle of creating a tortuous flow path for the fluid flow, so that solids in the fluid flow become entrapped within the filter media 26. This works well for relatively large particles entrained in the fluid flow, and a large fraction of the large particles are usually entrapped within a properly sized media filter 26. However, smaller particles having a small negative static charge and suspended in the fluid flow, termed "colloidal particles", may pass through the media filter 26, unless steps are taken to encourage their retention. The particles are repelled from each other by their negative charges, and resist capture by the filter media 26.

To increase the fraction of colloidal particles entrapped within the media filter 24, it has been known to add a continuous coagulant flow 30 from a coagulant source 32 to the input fluid flow 22, upstream of the media filter 24. The coagulant is a positively charged organic or inorganic material, such as poly(diallyldimethyl ammonium chloride), sometimes termed "DADMAC", which neutralizes the negative charge of the colloidal particles. (DADMAC is available commercially as Magnafloe 591C from American Cyanamid Company and from other companies.) With their negative charge neutralized, the colloidal particles naturally agglomerate into large particles, which in turn can become entrapped within the porosity of the filter media 26. With the continuous addition of precisely the right amount of the coagulant to neutralize the charge of the colloidal particles, excellent retention of the colloidal particles within the filter media 26 is achieved.

Periodically, when the amount of entrapped solid matter in the filter media 26 reaches an upper limit, the input fluid flow is halted by closing a valve 34 and a valve 36, thereby taking the media filter 24 "off line" so that the input fluid flow cannot pass through the filter and to the normal output fluid flow. A backwash flow of water is initiated by opening valves 38 and 40. Backwashing of a typical media filter requires about 15–30 minutes, and is usually required every 1–7 days, depending upon the contaminant loading of the input fluid flow. After the solid matter is removed from the filter media 26, the valves 38 and 40 are closed, and the valves 34 and 36 are opened, bringing the media filter 24 back "on line". "On line" and "off line" are terms of art in this field. As used herein, "on line" means that input fluid flow is passing through the media filter 24 and thereafter to its normal next processing step or final use, and "off line" is any other operational state. The media filter 24 is "off line", for example, if valve 94 is closed so that input fluid flow does not reach the media filter, or valve 36 is closed and some other exit path is provided so that fluid leaving the media filter 24 is discarded or otherwise not passed to the downstream processing equipment.

Thus, when the media filter 24 is on line, the fluid flow leaving the media filter 24 through the valve 36 is conducted to apparatus for removing dissolved impurities from the fluid. One type of such apparatus is a reverse-osmosis (R-O) unit 42. In the R-O unit 42, the fluid flow passes across a membrane. Impurities pass through the membrane and are removed as a concentrate, while the fluid flow, purified of dissolved impurities, is removed as a permeate process output flow 44.

It is sometimes observed that scale forms in the R-O unit 42, inhibiting its efficiency. To reduce the scale formation, a flow 46 of an anti-scalant is added from an anti-scalant source 48 to a fluid flow 50 after the flow 50 leaves the media filter 24 and before it enters the R-O unit 42. A typical anti-scalant chemical is polyacrylic acid.

In an idealized operation, the system 20 works well. In practice, however, the amount of colloidal matter in the input fluid flow can vary from time to time. The coagulant flow 30 must be adjusted accordingly, or there will sometimes be an excess of coagulant added to the fluid flow 22. Any excess of coagulant passes into the fluid flow 50 and can react with the anti-scalant compound to form a gummy residue that deposits in the R-O unit 42 and gradually accumulates to inhibit its efficiency. Consequently, system operators usually add either no coagulant or less than the optimal amount of coagulant required to neutralize the lowest expected concentration of colloidal solids, to ensure that no excess coagulant reaches the R-O unit 42 to react to form the residue. As a result of operating the system at a coagulant deficiency, some colloidal material inevitably reaches the output fluid flow 44.

Figure 2:
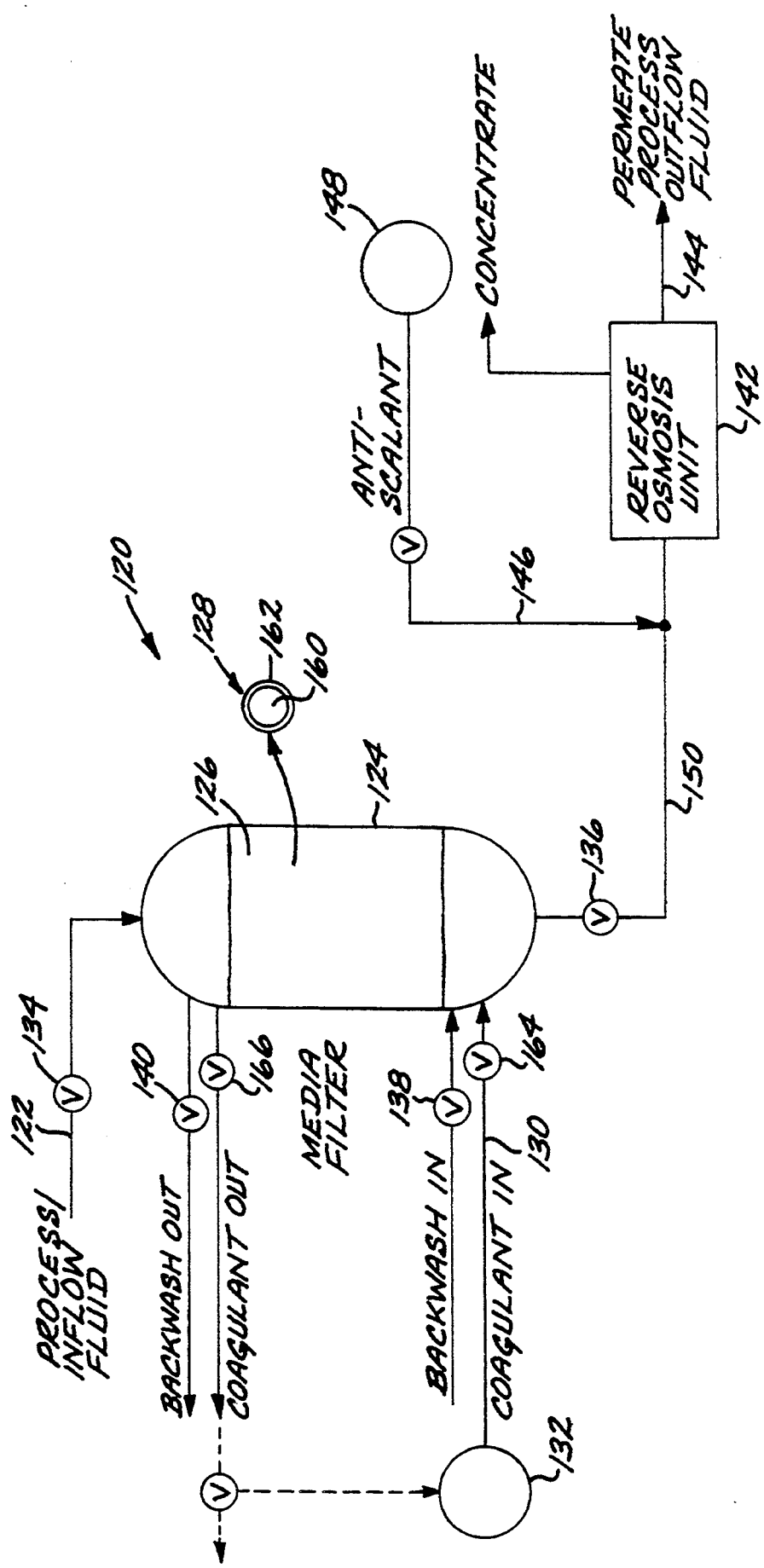
FIG. 2 is a schematic drawings of a filtration system according to the invention, with an enlarged insert showing a filter media particle.
Figure 3:
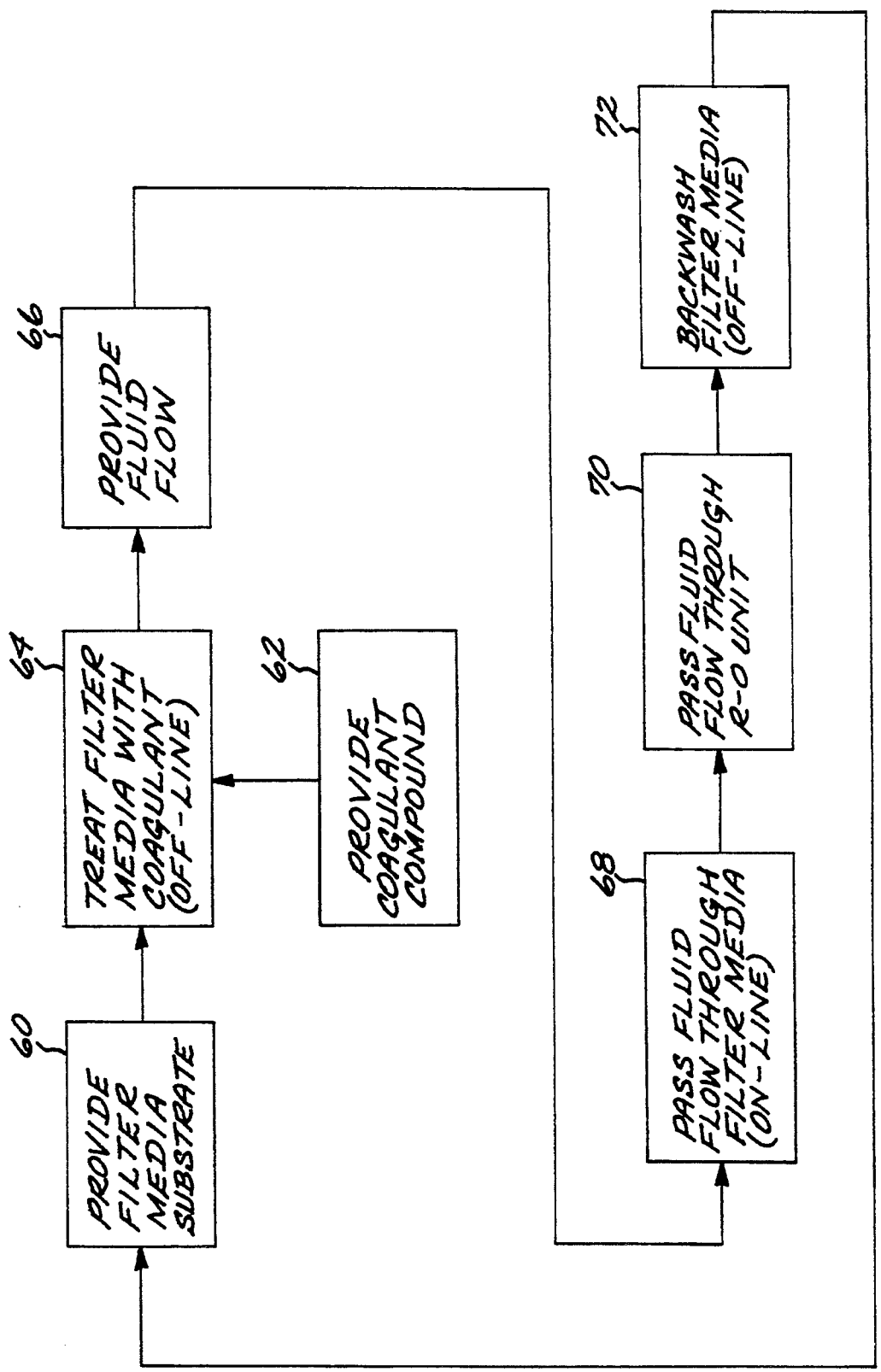
FIG. 3 is a process flow diagram of one embodiment of the invention.

FIG. 2 shows a system 120 according to the invention, and FIG. 3 depicts the process steps associated with this system 120. An input fluid flow 122 is introduced into a media filter 124, which contains a bed of particles of a filter media 126. Each filter media particle 128, shown in a magnified view in FIG. 2, comprises a substrate 160 and an adsorbed layer 162 of a coagulant compound. By contrast, the conventional filter media particles 28, shown in FIG. 1, have no adsorbed layer of coagulant.

A preferred procedure for forming the adsorbed layer 162 on the particle substrate 160, to produce the particle 128, is shown in FIG. 3. A filter media substrate 160 is first provided, numeral 60. The particle 160 may be of any type operable to adsorb the selected coagulant. Naturally occurring silica-based materials such as sand and gravel have been found to adsorb conventional coagulants in varying degrees. Carbon-based materials such as crushed coal can also adsorb coagulants.

Other naturally occurring and synthetically prepared materials such as glass have been found to have only a very small adsorbing capability, and are not normally good candidate materials for this application. However, such materials of limited adsorbing capability may be surface treated to improve their performance as substrate materials. For example, glass beads may be rendered suitable for the present process by coating the beads with polyacrylic acid and drying the beads. It is believed that the polyacrylic acid supplies negatively charged groupings on the surface of the glass beads to which the positively charged groups of the coagulant can bond. Any treatment which produces a suitably prepared surface on otherwise unsuitable candidate substrate materials would be operable. After this surface treatment, the beads are then treated with coagulant compound, as next described, and used in the process.

The most successful naturally occurring filter media particle substrates 160 have been found to be carbon-chain materials, such as organic materials and others that may include additional atoms wherein carbon atoms are linked together by carbon-carbon bonds. Materials used as ion exchange resins have been found to be suitable, as they adsorb the coagulants well and have a high surface area due to their mode of manufacture. (See, for example, U.S. Pat. No. 4,224,415, whose disclosure is incorporated by reference, for a description of the compositions and mode of fabrication of some ion exchange resin particles.)

The most effective ion exchange particle materials are cation exchange resins, with weak acid cation exchange resins such as methacrylate-divinyl-benzene resins (such as Rohm and Haas DP-1 resin) being preferred to strong acid cation exchange resins, further, it is preferred that the ion exchange resin be In the spent (e.g., with sodium replaced with calcium and magnesium) form prior to adsorption of the coagulant.

Surface-treated artificial materials have great commercial potential for a low-cost, highly effective filter media material for use in the present invention. For example, glass beads treated so as to adsorb coagulant compound have produced excellent performance in the media filter. Such glass beads or other treated artificial materials are inexpensive and can replace conventional media filter materials.

A coagulant compound is provided, numeral 62, in a form that can adsorb onto the surface of the filter media substrate particles 160. No limitation on the type of coagulant compound has been found, and all types tested have been found operable. The preferred coagulant compounds include poly(diallyl-dimethyl ammonium chloride) (DADMAC) type coagulants, such as Magnifloc 591C available commercially from American Cyanamid and as Filtermate 150 available commercially from Argo Scientific, and poly [oxyethylene (dimethyliminio) ethylene (dimethyliminio) ethylene dichloride] having a molecular weight of about 2500 and available commercially as Mayosperse 60 from The Mayo Corporation. The latter compound is most preferred because it is also a biocide that inhibits biological growth in the system.

The filter media substrate particles 150 are treated with the selected coagulant compound to adsorb the layer 162 onto the surface of each particle 160, see numeral 64 of FIG. 3. The treatment can utilize a batch approach wherein the coagulant compound is introduced into the media filter 124 and allowed to remain for a period of time. More preferably, the treatment 64 is accomplished by a flow approach with the media filter 124 off-line. "Off-line" means that there is no input fluid flow 122 through the media filter 124.

In one approach to the treatment 64, the media filter 124 is taken off line by closing a valve 134 and a valve 136 to isolate the media filter 124. Adsorption is accomplished by opening valves 164 and 166 to permit a flow of the liquid coagulant from a source 132 through the bed of filter media particles 160, for a period of time that is typically about 15 minutes. Preferably, the liquid coagulant is in a concentrated form, but may be slightly diluted without substantial interference with the adsorption process. The concentrated liquid coagulant adsorbs onto the surface of the particles 160 more rapidly than does a diluted coagulant. The excess unadsorbed coagulant can be discarded or returned to the source 132 for later reuse. In the latter case, there is typically some dilution, but the diluted coagulant from the source 132 can be reused until it can no longer achieve adsorption within an acceptable treatment time.

In an alternative approach to the treatment 64, the coagulant compound is introduced into the process input fluid flow 122 for a period of time, usually about 15 minutes. During this period, the media filter outflow 150 is diverted to waste and not permitted to reach the RO unit 142 due to the high coagulant concentration. Thus, the media filter 124 remains off line during this treatment.

Returning to the discussion of the preferred treatment 64, after the adsorption treatment is complete, the valves 164 and 165 are closed. The valves 134 and 136 are opened, bringing the media filter 124 back on line. The Input fluid flow 22, numeral 66, resumes so that the fluid to be cleaned of particulate again flows through the filter media 126, numeral 68. No continuous flow of coagulant is added to the fluid flow 122 when the media filter 124 is on line, in the present approach. The adsorbed coagulant on the filter media 126 accomplishes the removal of colloidal matter in the fluid flow.

The exact mechanism of the removal of colloidal matter in the present approach is not known with certainty, but it is believed to be different from that of the prior art. It is believed that in the present approach there is a direct interaction between colloidal particles and the adsorbed coagulant layer 162. Consequently, the ability to remove the colloidal particles is not dependent upon a concentration of the coagulant added in the coagulant flow 30 (FIG. 1). All colloidal matter is removed as long as there is a sufficient surface area of filter media 26 to capture the colloidal matter, and as long as there remains unreacted coagulant. In the prior approach, the coagulant in solution aided In the agglomeration of the coagulant into larger particles, which were then entrapped in tile interstices within the filter media 26. If insufficient coagulant was added at any moment, colloidal particles would pass through the filter media into the output flow. The operability of the present invention is not dependent upon any particular theory or mode of operation, and this possible explanation is not limiting of the invention in any respect.

The fluid flow 150 leaving the media filter 124, clarified of large solid matter and small colloidal matter, may optionally be (and usually is) further processed to remove dissolved matter, numeral 70. In the preferred approach, this processing is accomplished with a reverse-osmosis unit 142 as described previously, to produce an output fluid flow 144 that is clarified of solid and dissolved matter.

As discussed before, an anti-scalant flow 146 from a source 148 may be added to the fluid flow 150, after the fluid flow leaves the media filter 124 but before it enters the reverse-osmosis unit 142. The anti-scalant inhibits the development of scaling in the reverse-osmosis unit. The present approach achieves a major improvement over the prior approach (FIG. 1) in regard to the anti-scalant addition. In the prior approach a coagulant flow was added to the input fluid flow. If the coagulant flow rate at any moment was in excess of that required to agglomerate the colloidal matter concentration at that moment, some coagulant would pass through the media filter. This excess coagulant would react with the anti-scalant to produce the gummy residue in the reverse-osmosis unit. With the present approach, this problem is prevented because there is no continuous flow of coagulant. Operators can therefore achieve the benefits of using both coagulant and anti-scalant in the system, without concern for under-addition or over-addition of coagulant. Process control requirements and dependence upon operator skill are therefore lower in the present approach, important advantages in commercial operations.

In most media filters, it is necessary to periodically backwash the filter media, numeral 72 of FIG. 9, to remove accumulated solid matter. To accomplish the backwashing, the media filter 124 is taken off line by closing the valves 134 and 136. Backwash valves 138 and 140 are opened to permit a backwash flow to pass countercurrently through the filter media 126. After a sufficient time to remove accumulated solid matter, the valves 138 and 140 are closed and the valves 134 and 136 are opened to bring the media filter 124 back on line.

Both the backwash step 72 and the treatment step 64 are accomplished with the media filter off line. In the preferred approach, the treatment step to replenish the coagulant layer 162 are performed in the same off-line cycle. The steps 72 and 64 can be done simultaneously, so that the coagulant mixes with the backflow, or serially, with the backwash 72 preferably completed prior to starting the coagulant treatment 64. Or, as discussed for the alternative embodiment, the coagulant can be flowed through the media filter mixed with input fluid flow and with the media filter off line. After these steps 72 and 64 are completed, the media filter 124 is brought back on line and fluid treatment continues.

The backwashing 72 and coagulant treatment 64 replenishing of the coagulant layer 162 permit the filter media material to be used in multiple cycles.

Figure 4:
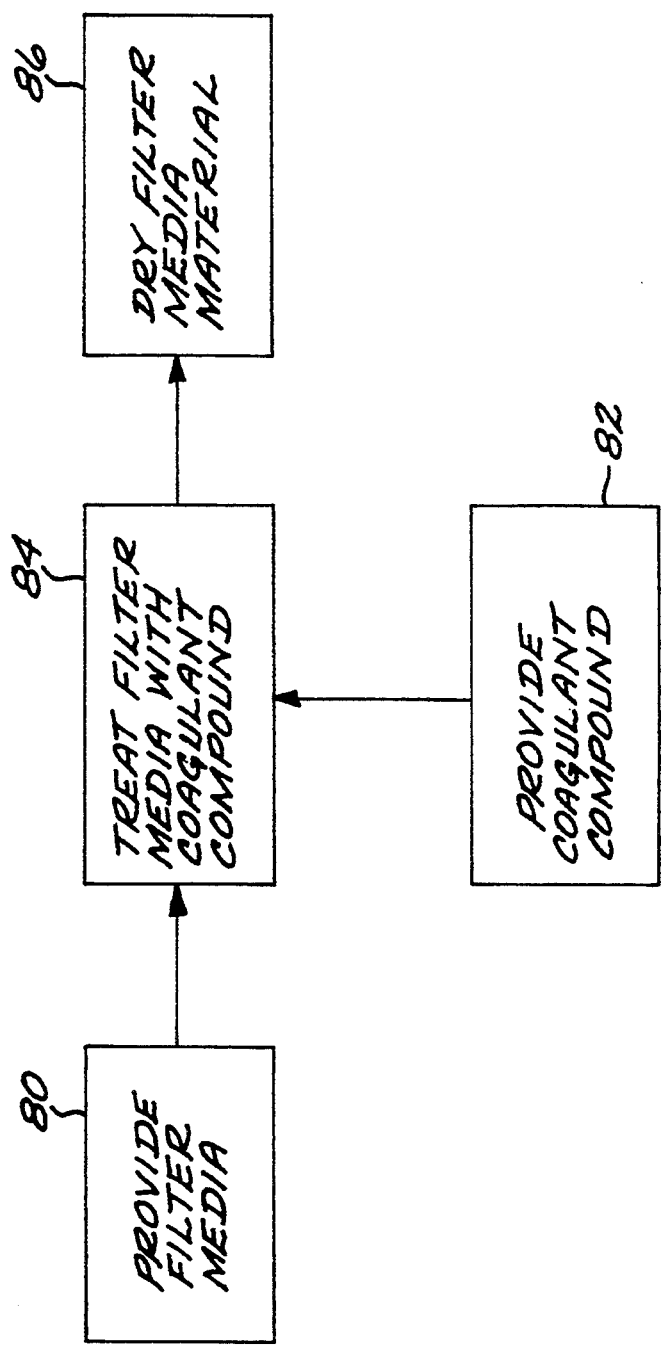
FIG. 4 is a process flow diagram of another embodiment of the invention.

In another aspect of the invention, a dry, solid, finely divided, particulate filter media can be prepared as shown in FIG. 4. The filter media is provided, numeral 80 and the coagulant compound is provided, numeral 82. The filter media is treated to adsorb coagulant onto its surface, numeral 84. These steps 80, 82, and 84 are respectively identical to the steps 60, 62, and 64 of FIG. 3, and that discussion is incorporated here. After the coagulant layer is formed on the surface of the filter media particles, the particles are dried, numeral 86, to produce a granular solid material. This material can be bagged or provided in bulk form to filter media users. It is a unique material, as no other filter media has an adsorbed coagulant layer. It can be used in systems which are not designed for backwash and regeneration processing. An example of such a system would be a water purification system that could be airlifted to a disaster area or battle area for quick response, without the weight associated with backwash and regeneration processing.

The following examples are presented to illustrate aspects of the invention. They should not be interpreted as limiting the scope or operation of the invention in any respect.

EXAMPLE 1

Five candidate finely divided filter media materials were evaluated for their ability to adsorb coagulant. The candidate substrate materials were styrene-divinyl benzene sulfonic acid, a strong acid cation exchange resin available commercially as Dowex 51-XB; methacrylic acid-divinyl benzene, a weak acid cationic exchange resin available commercially as Rohm & Haas Amberlite DP-1; xytel nylon available commercially from Dupont; untreated soda-lime silica glass available commercially from Cataphote; and coal/sand/garnet mixed filter media. No pre-adsorption surface preparation of the filter media particles was done.

Absorption testing was performed by shaking 10–25 cubic centimeters of the filter media substrate material in 50 milliliters of a 100 ppm (parts per million) solution of the selected coagulant. The coagulant remaining in solution after the adsorption was measured with a Taylor polyquat test kit. The results were as follows, with each condition expressed as substrate material/coagulant, and coagulant adsorbed in 103 milligrams adsorbed per square centimeter of substrate (media) surface area: nylon/Filtermate 150, 12.3; nylon/Mayosperse 60, 0.05; Dowex/Mayosperse 60, 4.4; Amberlite/Mayosperse 60, 2.6; sand/Mayosperse 60, 2.2; coal/Mayosperse 60, 1.5; garnet/Mayosperse 60, 0.84; untreated glass/Mayosperse 60, 0.5; untreated glass/Filtermate 150, 0.45.

EXAMPLE 2

A sixth and seventh filter media material were prepared by first surface treating particulates in order to increase their adsorption of coagulant, The sixth filter media material was prepared by treating soda-lime silica glass beads to increase their adsorption of coagulant. The glass beads were first contacted to polyacrylic acid resin in the form of Liquitec Acrylic gel medium available from Binney & Smith, Easton, Pa. The glass beads were contacted to the polyacrylic acid resin and dried in a drum mixer for 12 hours. The treatment was repeated to apply a second coating of the polyacrylic acid resin to the glass beads. After each treatment, most of the glass beads remained free flowing, but there was some lumping of glass beads together. The lumps, where present, could be easily broken up by hand.

The treated glass beads of the sixth filter media material were studied microscopically, and were observed to have irregular coatings of the polyacrylic acid resin. Further process development of the coating procedure is expected to improve the coating regularity and thence the performance of the sixth filter media material.

To prepare a seventh filter media material, the surface properties of other glass beads were modified by coating the glass beads with polyacrylic acid, $[CH_2CH(COOH)-]n$. To accomplish the coating, the glass beads were immersed in the polyacrylic acid for 30 minutes and thereafter removed from the polyacrylic acid and dried.

The sixth and seventh filter media material were tested for coagulant adsorption by the same approach as in Example 1. The results, expressed in the same manner as in Example 1, are: polyacrylic acid resin treated glass/Mayosperse 60, 1.2; polyacrylic acid treated glass/Mayosperse 60, 6.0. By comparison, the adsorption for untreated glass/Mayosperse 60 was 0.5.

The surface treatment prior to adsorption was successful in both cases in increasing the absorption of the coagulant.

In general, it may be expected that the greater the adsorption, the better is the performance of the filter media when used in the process of the invention. All of the tested combinations achieved some degree of adsorption, with some much better than others. However, other issues such as cost and durability may determine the choice of combinations of substrate material, possible pre-adsorption surface treatment, and coagulant in particular circumstances.

EXAMPLE 3

Studies of the operability of the present invention and comparative testing with the prior approaches were conducted using a laboratory-scale media filter formed of a four-inch diameter PVC pipe. Appropriate lines, valves, and pumps were provided. The system had the capability to operate with and without a continuous added flow of coagulant, to evaluate various operating conditions. The input fluid was municipal water, to which sufficient kaolin clay was added to provide a nominal turbidity of 1.5 NTU. Two coagulants were utilized in different test series, Filtermate 150 and Mayosperse 60, both described previously.

In a first test series, a conventional mixed filter media material, termed a "mixed-media material", of 8 inches of crushed coal, 10 inches of sand, and 8 inches of garnet, with Filtermate 150 coagulant, was evaluated in three conditions. The results for percentage of colloidal solids removed are as follows:

TABLE 1

| Test Condition | Mixed Media Pct Removed |
|---|---|
| no coagulant used at all (conventional filter) | 75% |
| continuous addition of coagulant in optimum amount (FIG. 1 embodiment) | 95% |
| adsorbed coagulant with no continuous flow of coagulant (the FIG. 2 embodiment) | 85% |

The FIG. 2 embodiment wherein coagulant is adsorbed onto the surface of the mixed media achieves improved performance as compared with the case of no coagulant use. However, the percentage removal of colloidal solids is not as high as that of the FIG. 1 embodiment, where there is a continuous addition of coagulant. However, the adsorbed coagulant still offers an important advantage over the use of a continuous addition of coagulant even in this case, because there can be no overfeeding coagulant in the case of adsorbed coagulant. Thus, there is no risk of reaction between excess coagulant and antiscalant which results in fouling of the reverse osmosis unit.

EXAMPLE 4

The ion exchange resins were evaluated as candidates for use as the filter media material, using the test apparatus described in Example 3 and the same surface of resin for each test. The Dowex 51-XB resin was evaluated with (coated) and without (uncoated) the Filtermate 150 coagulant in the regenerated condition (sodium form) and the spent condition (calcium and magnesium form). No coagulant was added to the fluid flow in any of the tests. The results are as follows:

TABLE 2

| Test Condition | Pct Removed |
|---|---|
| spent/coated | 89.1 |
| regenerated/coated | 73.6 |
| spent/uncoated | 75.3 |
| regenerated/uncoated | 69.2 |

The spent and coated resin produces the best results within this group.

EXAMPLE 5

Various combinations of filter media substrate, pretreatment, and media surface area were evaluated using the apparatus of Example 3. The media surface area was varied by varying the height of the amount of filter media material loaded into the column. The coagulant was Mayosperse 60 in each case.

The results are as follows. In the table, "Coag." indicates whether a coagulant is adsorbed onto the surface of the particles, N being "no" and Y being "yes".

TABLE 3

| | Filter Media | Coag. | Area Sq. Ft. | Pct Removed |
|---|---|---|---|---|
| 1. | Coal | N | 110 | 64 |
| 2. | Mixed-media | N | 540 | 75 |
| 3. | Mixed-media | Y | 540 | 85 |
| 4. | Dowex | N | 760 | 77 |
| 5. | Dowex | Y | 760 | 89 |
| 6. | DP-1 | Y | 110 | 86 |
| 7. | DP-1 | Y | 540 | 92 |
| 8. | DP-1 | N | 1050 | 91 |
| 9. | DP-1 | Y | 1050 | 96 |
| 10. | Glass | N | 1010 | 89 |
| 11. | Glass | Y | 1010 | 90 |
| 12. | Glass, polyacrylic acid resin pretreat | Y | 1010 | 97 |

Increasing amounts of any filter media increase the amount of colloids (i.e., turbidity) removed from the water. The adsorption of coagulant improved the performance of natural materials such as the mixed-media material, ion exchange resins such as the Dowex 51-XB resin, and glass.

Glass beads that are not pretreated and have no adsorbed coagulant achieve 89 percent colloids removal, sample 10. If coagulant is adsorbed onto the glass beads, sample 11, the improvement is small. The glass beads of sample 12 are the sixth filter media material of Example 2, which were first pretreated with the polyacrylic acid resin prior to coagulant adsorption. The performance of these pretreated and adsorbed glass beads is the best attained with any of the filter media materials studied, achieving 97 percent colloids removal. Highly effective colloids removal can thus be achieved using inexpensive materials such as glass beads that have been pretreated prior to coagulant adsorption.

EXAMPLE 6

Removal of colloids from water with an excessively high turbidity was studied. The apparatus and approach of Example 3 were used, except that sufficient kaolin clay was added to achieve turbidity of 4.5 NTU. The filter media material was 1050 square feet surface area of DP-1 resin with Mayosperse 60 coagulant adsorbed. About 97.7 percent of the colloids were removed.

The present invention thus improves the performance of media filtration systems. Although a particular embodiment of the invention has been described in detail for purposes of Illustration, various modifications may be made without departing from the spirit and scope of the invention. Accordingly, the invention is not to be limited except as by the appended claims.

What is claimed is:

1. A method of purifying a fluid flow to remove colloidal matter, comprising the steps of:
   providing an organic polymeric coagulant compound in a form that can adsorb onto the surface of a solid particulate filter media;
   providing in a media filter a finely divided solid particulate filter media that can adsorb the coagulant compound at its surface;
   pretreating the surface of the filter media to increase its ability to adsorb the coagulant compound at its surface, the step of pretreating including the step of contacting the surface of the finely divided solid particulate filter media with a reactant that deposits a negatively charged group on the surface of the particulate filter media;
   treating the filter media with the coagulant compound form such that a quantity of the coagulant compound is adsorbed onto the surface of the pretreated filter media, in off-line treatment of the media filter;
   providing a flow of a fluid containing colloidal matter; and
   passing the fluid containing colloidal matter through the filter media, In on-line operation of the media filter.

2. The method of claim 1, wherein the step of providing an unorganic polymeric coagulant compound includes the step of
   providing a concentrated coagulant compound.

3. The method of claim 1, wherein the step of providing an organic polymeric coagulant compound includes the step of
   providing a cationic polymer.

4. The method of claim 1, wherein the step of providing a flow of a fluid includes the step of
   providing a flow of water as the fluid.

5. The method of claim 1, wherein the step of providing in a media filter a finely divided solid particulate filter media includes the step of
   providing a silica-based material as the solid particular filter media.

6. The method of claim 1; wherein the step of providing in a media filter a finely divided solid particulate filter media includes the step of
   providing a carbon-chain material as the solid particulate filter media.

7. The method of claim 1, including the additional step, after the step of passing the fluid, of
   removing soluble impurities from the fluid flow at a point downstream of said media filter.

8. The method of claim 1, including the additional step, after the step of passing the fluid, of
   treating the fluid by a reverse-osmosis process.

9. A method of purifying a fluid flow to remove colloidal matter, comprising the steps of:
   providing a coagulant compound in a form that can adsorb onto the surface of a solid particulate filter media;
   providing in a media filter a finely divided solid particulate filter media that can adsorb the coagulant compound at its surface, the filter media being an ion exchange resin;
   treating the filter media with the coagulant compound form such that a quantity of the coagulant compound is adsorbed onto the surface of the filter media, in off-line treatment of the media filter;
   providing a flow of a fluid containing colloidal matter; and
   passing the fluid containing colloidal matter through the filter media, in on-line operation of the media filter.

10. The method of claim 9, wherein the step of providing in a media filter a finely divided solid particulate filter media includes the step of providing a weak acid cation exchange resin as the solid particulate filter media.

11. The method of claim 9, wherein the step of providing in a media filter a finely divided solid particulate filter media includes the step of providing a spent ion exchange resin as the solid particulate filter media.

12. A method of purifying a fluid flow to remove colloidal matter, comprising the steps of:

providing an organic polymeric coagulant compound in a form that can adsorb onto the surface of a solid particulate filter media;

providing in a media filter a finely divided solid particulate filter media that can adsorb the coagulant compound at its surface;

pretreating the surface of the filter media to increase its ability to adsorb the coagulant compound at its surface, the step of pretreating including the step of depositing negatively charged groups on the surface of the particulate filter media;

treating the filter media with the coagulant compound form such that a quantity of the coagulant compound is adsorbed onto the surface of the filter media, in off-line treatment of the media filter;

providing a flow of a fluid containing colloidal matter;

passing the fluid containing colloidal matter through the filter media, in on-line operation of the media filter;

removing the media filter from on-line operation;

repeating the steps of providing a coagulant compound and treating the filter media;

returning the media filter to on-line operation; and repeating the steps of providing a flow of a fluid and passing the fluid.

13. A method of purifying a fluid flow to remove colloidal matter, comprising the steps of:

providing an organic polymeric coagulant compound in a form that can adsorb onto the surface of a solid particulate filter media;

providing in a media filter a finely divided solid particulate filter media that can adsorb the coagulant compound at its surface;

pretreating the surface of the filter media to increase its ability to adsorb the coagulant compound at its surface, the step of pretreating including the step of depositing negatively charged groups on the surface of the particulate filter media;

treating the filter media with the coagulant compound form such that a quantity of the coagulant compound is adsorbed onto the surface of the filter media, in off-line treatment of the media filter;

providing a flow of a fluid containing colloidal matter;

passing the fluid containing colloidal matter through the filter media, in on-line operation of the media filter; and thereafter back washing the filter media in an off-line back washing.

14. The method of claim 13, including an additional step, after the step of back washing, of replenishing the filter media by adsorbing additional coagulant compound onto the surface of the filter media, in an off-line replenishing.

15. A method of purifying a fluid flow to remove colloidal matter, comprising the steps of:

providing an organic polymeric coagulant compound;

providing a finely divided solid particulate filter media that can adsorb the coagulant compound at its surface;

pretreating the surface of the filter media to increase its ability to adsorb the coagulant compound at its surface, the step of pretreating including the step of depositing negatively charged groups on the surface of the particulate filter media;

treating the filter media with the coagulant compound form so that a quantity of the coagulant compound is adsorbed onto the surface of the pretreated filter media, and thereafter discontinuing the step of treating;

providing a flow of a fluid containing colloidal matter; and passing the fluid containing colloidal matter through the filter media, without a continuing addition of coagulant compound to the flow of fluid.

16. A method of purifying a fluid flow to remove colloidal matter, comprising the steps of:

providing a coagulant compound in a form that can adsorb onto the surface of a filter media, the coagulant compound being selected from the group consisting of poly (diallyl-dimethyl ammonium chloride) and poly;

providing In a media filter a finely divided solid particulate filter media that can adsorb the coagulant compound at its surface;

pretreating the surface of the filter media to increase its ability to adsorb the coagulant compound at its surface, the step of pretreating including the step of depositing negatively charged groups on the surface of the particulate filter media;

treating the filter media with the coagulant compound form such that a quantity of the coagulant compound is adsorbed onto the surface of the filter media, in off-line treatment of the media filter;

providing a flow of a fluid containing colloidal matter; and passing the fluid containing colloidal matter through the filter media, in on-line operation of the media filter.

17. The method of claim 16, wherein the step of providing in a media filter a finely divided solid particulate filter media includes the step of providing glass beads as the solid filter media.

18. The method of claim 1, wherein the step of pretreating surface of the the filter media to improve the adsorbability of the coagulant compound upon the filter media includes the step of pretreating the filter media with polyacrylic acid.

* * * * *